United States Patent [19]

Pendergraft

[11] Patent Number: 5,015,459

[45] Date of Patent: May 14, 1991

[54] HIGH PRESSURE-LOW PRESSURE STEAM SYSTEM FOR EXTENDED CLAUS SULFUR RECOVERY PLANT

[75] Inventor: Paul T. Pendergraft, Houston, Tex.

[73] Assignee: Amoco Corporation, Chicago, Ill.

[21] Appl. No.: 443,989

[22] Filed: Nov. 30, 1989

[51] Int. Cl.$^5$ .................... G01B 17/04; B01J 8/04; B01D 50/00

[52] U.S. Cl. .................... 423/574 R; 422/190

[58] Field of Search .................... 423/574 R; 422/114, 422/115, 116, 171, 190

[56] References Cited

U.S. PATENT DOCUMENTS

| | | | |
|---|---|---|---|
| 28,830 | 5/1876 | Hunt, Jr. et al. | 423/574 R |
| 2,767,062 | 10/1956 | Duecker | 423/576 |
| 3,617,221 | 11/1971 | Egan et al. | 423/574 R |
| 3,702,884 | 11/1972 | Hunt, Jr. et al. | 423/222 |
| 3,749,762 | 7/1973 | Montgomery | 423/574 R |
| 3,758,676 | 9/1973 | Goddin, Jr. et al. | 423/574 R |
| 4,035,474 | 7/1977 | Kunkel et al. | 423/574 R |
| 4,071,607 | 1/1978 | Hiller et al. | 423/574 R |
| 4,124,696 | 11/1978 | Kunkel | 423/574 R |
| 4,180,554 | 12/1979 | Goddin, Jr. et al. | 423/574 R |
| 4,315,904 | 2/1982 | Lell et al. | 423/574 R |
| 4,391,790 | 7/1983 | Palm et al. | 423/574 R |
| 4,391,791 | 7/1983 | Palm et al. | 423/574 R |
| 4,426,369 | 1/1984 | Palm | 423/574 R |
| 4,430,317 | 2/1984 | Reed et al. | 423/574 R |
| 4,462,977 | 7/1984 | Reed | 423/574 R |
| 4,473,541 | 9/1984 | Palm | 423/574 R |
| 4,482,532 | 11/1984 | Cabanaw | 423/574 R |
| 4,483,844 | 11/1984 | Cabanaw | 423/574 R |
| 4,487,754 | 12/1984 | Reed | 423/574 R |
| 4,507,275 | 3/1985 | Reed | 423/574 R |
| 4,508,698 | 4/1985 | Reed | 423/574 R |
| 4,526,590 | 7/1985 | Palm et al. | 55/27 |
| 4,601,330 | 7/1986 | Palm et al. | 165/95 |
| 4,643,888 | 2/1987 | Palm | 423/574 R |
| 4,756,900 | 7/1988 | Pendergraft et al. | 423/574 R |

FOREIGN PATENT DOCUMENTS

| | | | |
|---|---|---|---|
| 938087 | 12/1973 | Canada | 423/574 R |
| 2708012 | 9/1977 | Fed. Rep. of Germany | 423/574 R |

OTHER PUBLICATIONS

Delta Engineering Corp., "Delta is . . . Sulfur Recovery".
A. B. Coady, "MCRC Process for Improving Claus Plant Recovery", 6/9/76.
A. B. Coady and R. E. Heigold, "The MCRC Sub-Dewpoint Claus Process", 9/14/83.
R. E. Heigold and D. E. Berkeley, "Pine River Uses Four-Converter MCRC", 9/12/83.
Enstar Engineering Co., "MCRC Sulfur Recovery Process", 2/26/85.
R. E. Heigold and D. E. Berkeley, "The MCRC Sub-Dewpoint Sulphur Recovery Process", 3/83.

Primary Examiner—Jeffrey E. Russel

[57] ABSTRACT

In a Claus process sulfur recovery plant of the type having at least three reactors operated alternately under high temperature Claus conditions and under cold bed adsorption conditions, an emissions-affecting pressure surge in a low pressure steam delivery system due to a high pressure to low pressure transition in a switched sulfur condenser is avoided by providing a dedicated low pressure condenser in the process gas stream at times when switching a condenser from a high pressure to a low pressure system would otherwise cause the emissions-affecting pressure surge to occur. Recoveries are maintained at high levels and operating difficulties with a prior art plant are avoided.

4 Claims, 1 Drawing Sheet

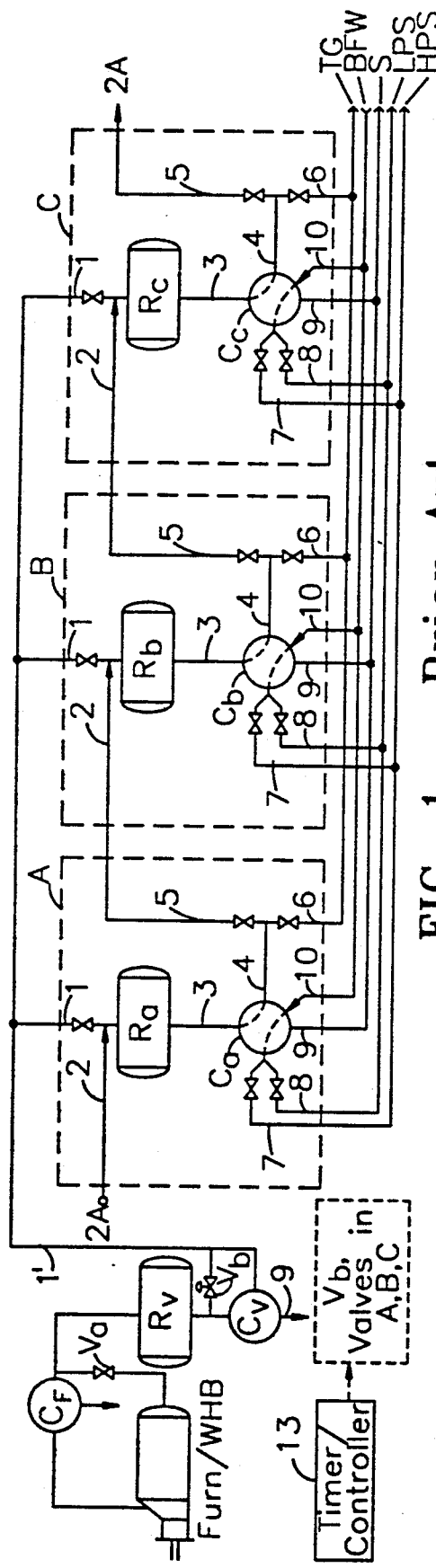
FIG. 1 – Prior Art
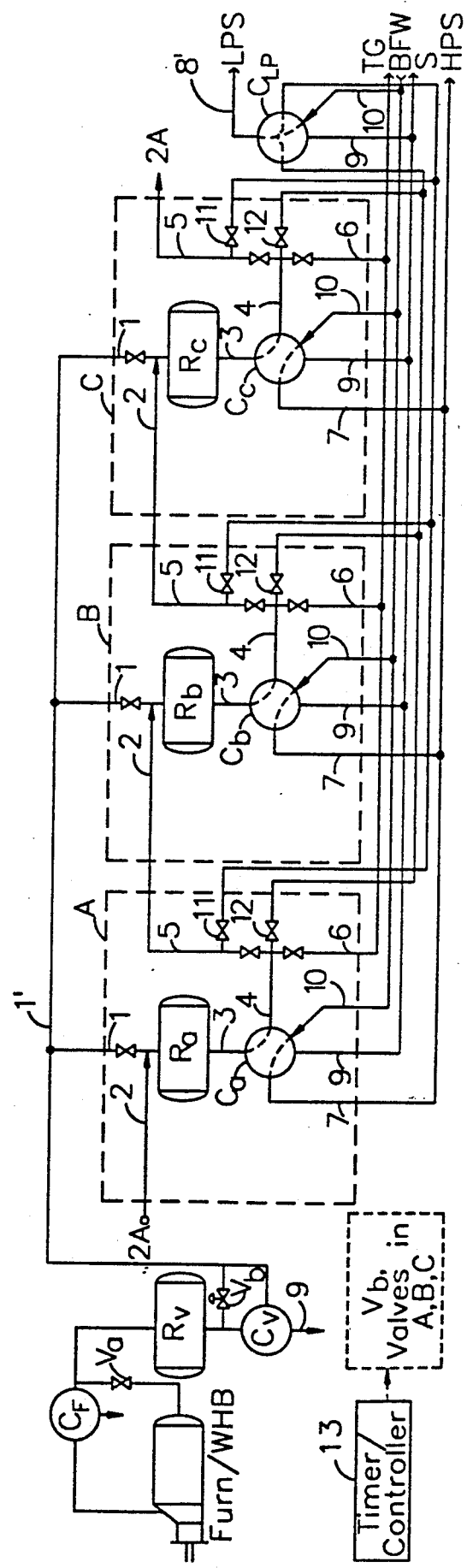
FIG. 2

HIGH PRESSURE-LOW PRESSURE STEAM SYSTEM FOR EXTENDED CLAUS SULFUR RECOVERY PLANT

FIELD OF THE INVENTION

The invention relates to producing low pressure and high pressure steam in extended Claus sulfur recovery plants of the type having at least three reactors each periodically alternated between operation under high temperature Claus conditions and operation under CBA (cold bed adsorption) conditions. In a particular aspect, the invention relates to producing such high pressure and low pressure steam by associating a high pressure condenser with each reactor and then periodically placing a low pressure condenser downstream of each high pressure condenser.

SETTING OF THE INVENTION

An extended Claus sulfur recovery plant comprises one or more catalytic reactors operated under high temperature Claus conditions in series with one or more catalytic reactors operated under CBA conditions. Under effective high temperature Claus conditions, sulfur formed in presence of Claus catalyst is continuously withdrawn from a reactor in vapor phase and condensed in a sulfur condenser and removed as liquid sulfur. Under effective CBA conditions, including temperature, a preponderance of sulfur formed is deposited and accumulated on the Claus catalyst. The sulfur is periodically removed during regeneration by high temperature gas flowing through the reactor effective for vaporizing sulfur which is withdrawn in vapor phase from the reactor and condensed in a sulfur condenser and removed as liquid sulfur. High temperature Claus operation can proceed concurrently with regeneration of catalyst in a reactor previously operated under CBA conditions.

Besides producing liquid sulfur, shell-and-tube indirect heat exchangers used as sulfur condensers produce useful steam. In such exchangers, boiler feed water in the shell side is converted to steam while in the tube side process gas containing sulfur vapor is cooled and sulfur is condensed and removed. For purposes of discussion, steam production on the shell side and process gas cooling and sulfur condensation on the tube side is assumed. However, steam production on the tube side and process gas cooling and sulfur condensation on the shell side can also be used.

Where the process gas after cooling is above about 300° F., high pressure steam (for example, 60 psig) can be produced. Where the process gas after cooling is below about 300° F. down to about 260° F., only low pressure steam (for example, 15 psig) can be produced.

High pressure steam has many uses in plants and represents significant economic advantage relative to low pressure steam which has fewer applications. It is desirable to maximize high pressure steam production and to produce low pressure steam only when high pressure steam cannot be produced consistent with efficient and cost effective design and operation of the sulfur plant.

In extended Claus processes, sulfur condensers cooling gas for introduction into CBA reactors, typically operated at temperatures less than about 300° F. during adsorption, can produce only low pressure steam whereas sulfur condensers feeding high temperature Claus reactors and reactors undergoing regeneration can be used to produce high pressure steam. When a reactor is alternated between CBA and high temperature Claus operation concurrent with regeneration, a condenser feeding that reactor sometimes produces high pressure steam and sometimes produces low pressure steam.

In the type of extended Claus sulfur recovery plant in which three or more reactors are each periodically alternated between CBA and high temperature Claus conditions, conventional plant design associates a sulfur condenser with a reactor and rotates the reactor/condenser condenser pair as a unit. Such a plant is shown in FIG. 1—PRIOR ART in which letters A, B, C indicate generally such units. TABLE A identifies reference numerals in FIG. 1 for easy identification.

TABLE A

| Symbol | Refers To |
| --- | --- |
| FURN/WHB | Claus furnace (FURN) with waste heat boiler (WHB) |
| $C_F$ | Furnace sulfur condenser |
| $V_a$ | WHB bypass reheat valve |
| $R_v$ | Claus reactor (dedicated to high temperature Claus operation) |
| $C_v$ | Claus reactor condenser |
| $V_b$ | Claus reactor condenser bypass reheat valve |
| A | Claus/CBA Reactor Unit A |
| B | Claus/CBA Reactor Unit B |
| C | Claus/CBA Reactor Unit C |
| 1,1' | Process gas supply to reactor unit from $C_v$ or another reactor or reactor unit |
| 2 | Alternate process gas supply to reactor unit from another reactor unit |
| 3 | Reactor effluent line |
| 4 | Condenser effluent line |
| 5 | Effluent line to another reactor unit |
| 6 | Effluent line to tail gas (TG) disposal |
| 7 | High pressure steam (HPS) line |
| 8 | Low pressure steam (LPS) line |
| 9 | Liquid sulfur (S) outlet |
| 10 | Boiler feedwater (BFW) line |
| 13 | Timer/controller for valves |

Table 1 shows steam production and operation sequences for operation of the FIG. 1 plant.

TABLE 1

Switching Sequence and Steam Production in FIG. 1 Plant

| Mode[1] | Period[2] | Reactor Position[3] | | | Condenser Cv | | Condenser Ca | | Condenser Cb | | Condenser Cc | |
| --- | --- | --- | --- | --- | --- | --- | --- | --- | --- | --- | --- | --- |
| | | Ra | Rb | Rc | From/To[4] | Steam Press. | From/To | Steam Press. | From/To | Steam Press. | From/To | Steam Press. |
| A | Claus 2 | 2 | 3 | 4 | Rv/Ra | 60 psi | Ra/Rb | 60 psi | Rb/Rc | 15 psi | Rc/TG | ** |
| A | Heat Up | 2 | 3 | 4 | Rv/Ra | Bypass | Ra/Rb | 60 psi | Rb/Rc | 15 psi | Rc/TG | ** |
| A | Plateau | 2 | 3 | 4 | Rv/Ra | Bypass | Ra/Rb | 60 psi | Rb/Rc | 15 psi | Rc/TG | ** |
| A | Heat Soak | 2 | 3 | 4 | Rv/Ra | Bypass | Ra/Rb | 60 psi] | Rb/Rc | 15 psi | Rc/TG | ** |
| C | Precool | 3 | 4 | 2 | Rv/Rc | 15 psi | Ra/Rb | 15 psi] | Rb/TG | ** | Rc/Ra | 15 psi |
| B | Claus 2 | 4 | 2 | 3 | Rv/Rb | Bypass | Ra/TG | **5 | Rb/Rc | 60 psi | Rc/Ra | 15 psi |
| B | Heat Up | 4 | 2 | 3 | Rv/Rb | Bypass | Ra/TG | ** | Rb/Rc | 60 psi | Rc/Ra | 15 psi |
| B | Plateau | 4 | 2 | 3 | Rv/Rb | Bypass | Ra/TG | ** | Rb/Rc | 60 psi | Rc/Ra | 15 psi |
| B | Heat Soak | 4 | 2 | 3 | Rv/Rb | Bypass | Ra/TG | ** | Rb/Rc | 60 psi] | Rc/Ra | 15 psi |
| A | Precool | 2 | 3 | 4 | Rv/Ra | 15 psi | Ra/Rb | 15 psi | Rb/Rc | 15 psi] | Rc/TG | ** |

TABLE 1-continued

Switching Sequence and Steam Production in FIG. 1 Plant

| Mode[1] | Period[2] | Reactor Position[3] | | | Condenser Cv | | Condenser Ca | | Condenser Cb | | Condenser Cc | |
|---|---|---|---|---|---|---|---|---|---|---|---|---|
| | | Ra | Rb | Rc | From/To[4] | Steam Press. | From/To | Steam Press. | From/To | Steam Press. | From/To | Steam Press. |
| C | Claus 2 | 3 | 4 | 2 | Rv/Rc | 60 psi | Ra/Rb | 15 psi | Rb/TG | ** | Rc/Ra | 60 psi |
| C | Heat Up | 3 | 4 | 2 | Rv/Rc | Bypass | Ra/Rb | 15 psi | Rb/TG | ** | Rc/Ra | 60 psi |
| C | Plateau | 3 | 4 | 2 | Rv/Rc | Bypass | Ra/Rb | 15 psi | Rb/TG | ** | Rc/Ra | 60 psi |
| C | Heat Soak | 3 | 4 | 2 | Rv/Rc | Bypass | Ra/Rb | 15 psi | Rb/TG | ** | Rc/Ra | 60 psi] |
| B | Precool | 4 | 2 | 3 | Rv/Rb | 15 psi | Ra/TG | ** | Rb/Rc | 15 psi | Rc/Ra | 15 psi] |
| A | Claus 2 | 2 | 3 | 4 | Rv/Ra | 60 psi | Ra/Rb | 60 psi | Rb/Rc | 15 psi | Rc/TG | ** |

[1]Each mode is characterized by specific flow sequence of process gas through reactors: A(Rv, Ra, Rb, Rc); B(Rv, Rc, Ra, Rb); C(Rv, Rb, Rc, Ra).
[2]Period describes operation of reactor in 2d position, except Precool occurs with freshly regenerated reactor in 3d position.
[3]Reactor position shows relative position in process stream of reactors Ra, Rb, Rc.
[4]Refers to source and destination of process gas in sulfur condenser.
[5]The steam in the shell of the condenser following the final CBA unit may be at either 15 or 60 psig or in transition. There should be no sulfur condensation in this condenser, and if it is cooled more than necessary, more fuel will be required in the incinerator, but the differences are minimal.

In the FIG. 1 plant, reactor $R_v$ is operated only as a Claus reactor ("Claus 1") while reactors $R_a$, $R_b$, $R_c$ alternate between CBA operation and Claus operation. (Note: A reactor operated under high temperature Claus conditions may be referred to as a Claus reactor; likewise, a reactor operated under CBA conditions may be referred to as a CBA reactor-both Claus and CBA reactors catalyze the Claus reaction.) A reactor previously operated under CBA conditions which is being regenerated in the second position also operates as a second Claus reactor ("Claus 2"). CBA operation in the FIG. 1 plant occurs when a reactor is in the third and fourth positions The third position reactor (feed temperature above about 280°-300° F. or more) is generally operated as a "warm" CBA except during Precool when hot, freshly regenerated catalyst in the reactor in the third position is being cooled to CBA conditions. The fourth position reactor is generally operated as a "cool" CBA (feed temperature about 250°-260° F.) for maximum recovery. Regeneration in the second position concurrently with Claus 2 operation includes heatup, plateau, and heat soak as is known to those skilled in the art (see, for example, U.S. Pat. Nos. 4,482,532 and 4,822,591 which are incorporated herein by reference). Precooling of a newly regenerated reactor is accomplished prior to returning a reactor to CBA operation. These steps individually are well known to those well skilled in the art, and from FIG. 1 and TABLE 1 those skilled in the art will fully understand the proper sequence of operation.

A preferred precooling method for the FIG. 1 plant is a "backstep," such as precooling in mode C following regeneration in Mode A and prior to switching to Mode B, as this method does not preload with sulfur a freshly regenerated reactor before it is placed under CBA conditions.

The three condensers $C_a$, $C_b$, $C_c$ in the FIG. 1 plant are tied to both low pressure (LPS) and high pressure (HPS) headers and produce either 15 psig or 60 psig steam at various times as shown in TABLE 1. This controls the effluent temperature from the condensers feeding CBA reactors during the different parts of the cycle to accomplish high sulfur recovery levels In TABLE 1, it can be seen that each of condensers $C_a$, $C_b$, $C_c$, of FIG. 1 must undergo a high pressure to low pressure transition (indicated by brackets) at certain points in the cycle. At the time of the transition, each such condenser is full of hot water in equilibrium with high pressure stream at 60 psig. When switched to produce into the low pressure stream header, a large portion of this water tends to flash into steam which overloads the low pressure steam system. Thus a high pressure to low pressure transition in a condenser causes a pressure surge in the low pressure steam system. As a result, the pressure in the entire low pressure steam system increases until the excess steam can be condensed, sometimes taking several hours before the low pressure steam system returns to its normal operating pressure. This pressure surge in the low pressure steam system causes condensers connected into the low pressure steam system not to provide the cooling required for feeding process gas at an optimum temperature to a downstream CBA reactor. The resulting temperature increase in the process gas being fed to a downstream CBA reactor results in an increase in emissions from the plant since Claus conversion decreases with increasing temperature. This increase in emissions due to temperature rise in the process gas effluent from the sulfur condenser feeding the final CBA reactor continues, often for several hours, since the temperature wave moving through the catalytic reactor is slow and broad. Further, the surge in steam pressure in the low pressure system can upset any process using the low pressure steam.

Thus, the problem addressed by this invention may be described as an emissions-affecting pressure surge in the low pressure steam system of the FIG. 1 plant which results when a high pressure to low pressure transition occurs on the steam side of a sulfur condenser and causes the condenser to fail to provide adequate cooling of process gas for a final CBA reactor. Another aspect of the problem is that the surge in the low pressure steam system can cause other condensers connected to the low pressure steam system to fail to provide adequate cooling. Another aspect of the problem is that the surge in the low pressure steam system can upset processes using the low process steam. Since the FIG. 1 plant otherwise provides highly satisfactory performance (the use of three alternating Claus/CBA reactors as in FIG. 1 provides the highest sulfur recovery of known extended Claus plants), it is desirable to generally retain the plants' advantageous features, including production of high pressure and low pressure steam, while solving this problem.

However, it is difficult to inexpensively solve this problem because of the large volume of steam generated by a sulfur condenser when the condenser is switched from operation at high pressure to operation as part of the low pressure steam delivery system. An auxiliary condenser can be added downstream of each of condensers $C_a$, $C_b$, and $C_c$ to produce low pressure steam, with process gas flowing through each auxiliary condenser only when lower effluent temperatures are required, and at other times, the process gas bypassing the auxiliary condensers. This modification requires the addition of three condensers and six switching valves. Since condensers are large and more expensive than reactors, this addition of condensers is undesirable and represents a costly solution to the problem.

An object of the invention is to provide an improved extended Claus process and plant of the type having at least three reactors each periodically operated alternately under Claus and CBA conditions. Another object of the invention is to provide such an improved process and plant in which no condenser undergoes a high pressure to low pressure transition when connected in the low pressure steam delivery system and in which, therefore, such a transition does not result in an emissions-affecting pressure surge in the low pressure steam system. Other objects and advantages will be apparent to those skilled in the art from the following description and the claims.

THE INVENTION

An improved extended Claus process and plant is illustrated in FIG. 2. The invention there illustrated eliminates the need for a condenser connected in the low pressure steam delivery system undergoing a high pressure to low pressure transition and prevents also the otherwise occurring increase in sulfur emissions.

Compared to the FIG. 1—PRIOR ART plant, the invention requires only one auxiliary low pressure steam sulfur condenser. Thus, besides solving the problems caused by switching a condenser between two steam generation pressures, it eliminates the need for two of the auxiliary low pressure condensers. In the new configuration, a single low pressure condenser ($C_{LP}$), periodically placed downstream of each high pressure condenser, cools the process gas being fed to the final reactor operating under CBA conditions. Switching valves allow process gas to be fed to a condenser $C_{LP}$ from another condenser which would otherwise be undergoing a high pressure to low pressure transition in attempting to provide process effluent gas at the proper temperature for high levels of recovery in a downstream CBA reactor. Since $C_{LP}$ is always operated under low pressure conditions, a high pressure surge in the low pressure steam delivery system is avoided and high levels of recoveries of sulfur are maintained and both high pressure steam and low pressure steam continue to be available.

According to an apparatus aspect of the invention, a Claus process sulfur recovery plant comprises at least three catalytic reactors each periodically alternated between operation under high temperature Claus conditions and under CBA conditions. Each catalytic reactor has a downstream sulfur condenser connected into a system for delivering a first pressure of steam. A sulfur condenser connected into the system for producing the first pressure of steam and providing process gas effluent to a final catalytic reactor operated under CBA conditions first provides the process gas effluent to another sulfur condenser producing second pressure steam, the first pressure being greater than the second pressure.

According to a process aspect of the invention, an improved extended Claus process for a plant comprising at least first, second and third catalytic reactors, each periodically operated under Claus and under CBA conditions, provides effluent process gas from respective reactors to first, second and third sulfur condensers. The process gas from catalytic reactors operated under either high temperature Claus conditions or lower temperature CBA conditions is effective for producing a first pressure of steam when an adjacent downstream reactor is operated above about 300° F.; and for producing a second pressure of steam when a downstream reactor is operated at a temperature below about 300° F., the first pressure being greater than the second pressure. In the improved process, first pressure steam is produced by directing process effluent gas effective for producing first pressure steam from first, second and third catalytic reactors to respective first, second and third sulfur condensers connected together as part of a high pressure steam delivery system; and second pressure steam is produced by directing process effluent gas periodically respectively from one of first, second and third sulfur condensers to a fourth sulfur condenser during periods in which a first pressure to second pressure transition would occur if one of the first, second or third condensers were switched from first pressure to second pressure steam production; and cooled process gas from the fourth sulfur condenser is provided to a final position Claus catalytic reactor operated under CBA conditions.

BRIEF DESCRIPTION OF THE DRAWINGS

FIG. 1, labeled PRIOR ART, represents an extended Claus process plant of the type having at least three reactors periodically alternated between operation under high temperature Claus conditions and under CBA conditions.

FIG. 2 illustrates an improved extended Claus process and plant in accordance with the invention.

DETAILED DESCRIPTION OF THE INVENTION

Referring now to FIG. 2, it will be seen that FIG. 2 differs from FIG. 1 by the addition of sulfur condenser $C_{LP}$ and valved lines 11 and 12 in each of reactor units A, B, C. Valved lines 11 and 12 permit $C_{LP}$ to receive process gas from each of $C_a$, $C_b$, and $C_c$ depending on which valves are opened and shut, and returns the cooled processed gas to the next downstream reactor depending on the mode of operation.

TABLE 2

Switching Sequence and Steam Production in FIG. 2 Plant

| Mode[1] | Period[2] | Reactor Position[3] | | | Condenser Cv | | Condenser Ca | | Condenser Cb | | Condenser Cc | | Condenser $C_{LP}$ | |
|---|---|---|---|---|---|---|---|---|---|---|---|---|---|---|
| | | Ra | Rb | Rc | From/To[4] | Steam Press. | From/To | Steam Press. | From/To | Steam Press. | From/To | Steam Press. | From/To | Steam Press. |
| A | Claus 2 | 2 | 3 | 4 | Rv/Ra | 60 psi | Ra/Rb | 60 psi | Rb/$C_{LP}$ | 60 psi | Rc/TG | 60 psi | Cb/Rc | 15 psi |
| A | Heat Up | 2 | 3 | 4 | Rv/Ra | Bypass | Ra/Rb | 60 psi | Rb/$C_{LP}$ | 60 psi | Rc/TG | 60 psi | Cb/Rc | 15 psi |
| A | Plateau | 2 | 3 | 4 | Rv/Ra | Bypass | Ra/Rb | 60 psi | Rb/$C_{LP}$ | 60 psi | Rc/TG | 60 psi | Cb/Rc | 15 psi |
| A | Heat Soak | 2 | 3 | 4 | Rv/Ra | Bypass | Ra/Rb | 60 psi | Rb/$C_{LP}$ | 60 psi | Rc/TG | 60 psi | Cb/Rc | 15 psi |
| C | Precool | 3 | 4 | 2 | Rv/Rc | 15 psi | Ra/$C_{LP}$ | 60 psi | Rb/TG | 60 psi | Rc/Ra | 60 psi | Ca/Rb | 15 psi |

TABLE 2-continued

Switching Sequence and Steam Production in FIG. 2 Plant

| Mode[1] | Period[2] | Reactor Position[3] Ra | Rb | Rc | Condenser Cv From/To[4] | Steam Press. | Condenser Ca From/To | Steam Press. | Condenser Cb From/To | Steam Press. | Condenser Cc From/To | Steam Press. | Condenser $C_{LP}$ From/To | Steam Press. |
|---|---|---|---|---|---|---|---|---|---|---|---|---|---|---|
| B | Claus 2 | 4 | 2 | 3 | Rv/Rb | 60 psi | Ra/TG | 60 psi | Rb/Rc | 60 psi | Rc/$C_{LP}$ | 60 psi | Cc/Ra | 15 psi |
| B | Heat Up | 4 | 2 | 3 | Rv/Rb | Bypass | Ra/TG | 60 psi | Rb/Rc | 60 psi | Rc/$C_{LP}$ | 60 psi | Cc/Ra | 15 psi |
| B | Plateau | 4 | 2 | 3 | Rv/Rb | Bypass | Ra/TG | 60 psi | Rb/Rc | 60 psi | Rc/$C_{LP}$ | 60 psi | Cc/Ra | 15 psi |
| B | Heat Soak | 4 | 2 | 3 | Rv/Rb | Bypass | Ra/TG | 60 psi | Rb/Rc | 60 psi | Rc/$C_{LP}$ | 60 psi | Cc/Ra | 15 psi |
| A | Precool | 2 | 3 | 4 | Rv/Ra | 15 psi | Ra/Rb | 60 psi | Rb/$C_{LP}$ | 60 psi | Rc/TG | 60 psi | Cb/Rc | 15 psi |
| C | Claus 2 | 3 | 4 | 2 | Rv/Rc | 60 psi | Ra/$C_{LP}$ | 60 psi | Rb/TG | 60 psi | Rc/Ra | 60 psi | Ca/Rb | 15 psi |
| C | Heat Up | 3 | 4 | 2 | Rv/Rc | Bypass | Ra/$C_{LP}$ | 60 psi | Rb/TG | 60 psi | Rc/Ra | 60 psi | Ca/Rb | 15 psi |
| C | Plateau | 3 | 4 | 2 | Rv/Rc | Bypass | Ra/$C_{LP}$ | 60 psi | Rb/TG | 60 psi | Rc/Ra | 60 psi | Ca/Rb | 15 psi |
| C | Heat Soak | 3 | 4 | 2 | Rv/Rc | Bypass | Ra/$C_{LP}$ | 60 psi | Rb/TG | 60 psi | Rc/Ra | 60 psi | Ca/Rb | 15 psi |
| B | Precool | 4 | 2 | 3 | Rv/Rb | 15 psi | Ra/TG | 60 psi | Rb/Rc | 60 psi | Rc/$C_{LP}$ | 60 psi | Cc/Ra | 15 psi |
| A | Claus 2 | 2 | 3 | 4 | Rv/Ra | 60 psi | Ra/Rb | 60 psi | Rb/$C_{LP}$ | 60 psi | Rc/TG | 60 psi | Cb/Rc | 15 psi |

[1]Each mode is characterized by specific flow sequence of process gas through reactors: A(Rv, Ra, Rb, Rc); B(Rv, Rc, Ra, Rb); C(Rv, Rb, Rc, Ra).
[2]Period describes operation of reactor in 2d position, except Precool occurs with freshly regenerated reactor in 3d position.
[3]Reactor position shows relative position in process stream of reactors Ra, Rb, Rc.
[4]Refers to source and destination of process gas in sulfur condenser.

Since condenser $C_a$, $C_b$, $C_c$ can now be continually operated as part of the high pressure steam system, valves are not necessary in lines 7 and valved lines 8 can be eliminated. Thus, the modification requires 6 valves and a condenser, but eliminates the need for 6 valves. In operation, during the time when one of condenser $C_a$, $C_b$, $C_c$ is providing process gas effluent to a final catalytic reactor operated under CBA conditions, the valve in line 5 can be closed and process gas effluent can be provided to $C_{LP}$ via line 12 and returned to the inlet line to the final position CBA reactor by line 11. Since condenser $C_{LP}$ is not alternated between low pressure and high pressure steam systems, an emission-affecting temperature increase does not occur and emissions continue at a low level. Timer/controller 13 can be used by those skilled in the art to fully automate the sulfur recovery cycle from the description herein.

Those skilled in the art will fully understand the invention from FIG. 2, having reference numerals identified in TABLE A and in the preceding two paragraphs, together with TABLE 2 above showing operation sequences and steam production for the FIG. 2 plant.

From TABLE 2, it can be seen that the high pressure to low pressure transition which occurs in the FIG. 1 plant does not occur in the FIG. 2 plant. In fact, the condenser in which the high pressure to low pressure transition would otherwise occur feeds during that portion of its operation an auxiliary low pressure condenser $C_{LP}$ which accordingly produces low pressure steam. No high pressure to low pressure transition occurs in any sulfur condenser and no impact of operating temperatures on downstream CBA reactors occurs. Each of condenser $C_a$, $C_b$, and $C_c$ is continuously connected into the high pressure steam system and contributes to high pressure steam production.

The invention has been described in terms of specific and preferred embodiments, but is not limited thereto, but by the following claims interpreted in accordance with applicable principles of law.

What is claimed is:

1. In an extended Claus process having at least first, second and third Claus catalytic reactors providing process gas respectively to first, second, and third sulfur condensers, the first, second, and third condensers being connected to a steam delivery system, the improvement comprising:
producing first pressure steam by directing process gas effective for producing steam at said first pressure from first, second and third catalytic reactors to first, second and third sulfur condensers respectively;
producing second pressure steam by directing process gas periodically from one of said first, second and third sulfur condensers to a fourth sulfur condenser;
providing cooled process gas from the fourth sulfur condenser to a final position Claus catalytic reactor operated under effective cold bed adsorption conditions.

2. The process of claim 1
wherein said first, second and third sulfur condensers are alternately connected to a first pressure steam delivery system and to a second pressure steam delivery system; and
wherein a high pressure to low pressure transition occurs in a condenser connected to the second pressure steam delivery system upon one of first, second and third sulfur condensers being alternated from being connected to first pressure steam delivery system to being connected to second pressure steam delivery system; and
wherein the high pressure to low pressure transition causes a pressure surge in the second pressure steam delivery system and an increase in sulfur emissions from the plant; and
wherein the improvement comprises:
maintaining the first, second and third condensers continuously connected to the first pressure steam delivery system; and
providing effluent to said another condenser connected into the second pressure steam delivery system from one of the first, second and third condensers at least during periods where effluent gas from said one condenser requires further cooling for operating a downstream Claus reactor under effective cold bed adsorption conditions.

3. A Claus process sulfur recovery plant comprising at least three catalytic reactors periodically alternated between operation under high temperature Claus conditions and under cold bed adsorption conditions
each catalytic reactor having a sulfur condenser associated therewith for producing a first pressure steam;
each sulfur condenser of each catalytic reactor having a process gas effluent line connectable via controlling valves in flow communication with a further sulfur condenser producing second pressure steam, said second pressure steam being at a lower pressure than said first pressure steam, said further sulfur condenser having a process gas effluent line connectable by controlling valves in flow communication with a process gas inlet of a final catalytic reactor operated under cold bed adsorption conditions whereby a sulfur condenser producing first pressure steam and providing process gas effluent to the final catalytic reactor operated under cold bed adsorption conditions first provides process gas effluent to said further sulfur condenser.

4. A Claus process sulfur recovery plant comprising at least three catalytic reactors periodically alternated between operation under high temperature Claus conditions and cold bed adsorption conditions wherein each catalytic reactor has a downstream sulfur condenser for producing a first pressure of steam; and wherein a sulfur condenser producing first pressure steam and providing process gas effluent to a final catalytic reactor operated under cold bed adsorption conditions first provides process gas effluent to another sulfur condenser producing second pressure steam, said first pressure being greater than the second pressure; and further comprising a fourth sulfur condenser for producing second pressure steam less than first pressure steam; and controller means for periodically under instrument control placing the fourth condenser in a process line between each of the first, second and third sulfur condenser and a downstream Claus catalytic reactor operated under cold bed adsorption conditions.

* * * * *